United States Patent
Chen et al.

(10) Patent No.: US 9,964,199 B2
(45) Date of Patent: May 8, 2018

(54) TRANSMISSION STORAGE OIL LEVEL CONTROL WITH A SOLENOID ON AND OFF PULSE

(71) Applicant: GM Global Technology Operations LLC, Detroit, MI (US)

(72) Inventors: Yan Ann Chen, Windsor (CA); Samuel J. Harbin, White Lake, MI (US); John C. Buchanan, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 179 days.

(21) Appl. No.: 15/096,955

(22) Filed: Apr. 12, 2016

(65) Prior Publication Data

US 2017/0292602 A1 Oct. 12, 2017

(51) Int. Cl.
*F16H 57/04* (2010.01)

(52) U.S. Cl.
CPC ....... *F16H 57/0449* (2013.01); *F16H 57/045* (2013.01); *F16H 57/0405* (2013.01)

(58) Field of Classification Search
CPC ............. F16H 57/0449; F16H 57/0405; F16H 57/045; F16H 57/0447; F16H 57/0467; F16H 57/0423; F16H 57/041; F16H 48/08; F01M 1/12; B60B 35/16
See application file for complete search history.

(56) References Cited

U.S. PATENT DOCUMENTS

| | | | | |
|---|---|---|---|---|
| 4,921,165 A * | 5/1990 | Ty | ....... | F16H 57/0447 236/101 C |
| 5,101,936 A * | 4/1992 | Paredes | .... | F01M 1/12 123/196 S |
| 2006/0054410 A1* | 3/2006 | Nakamura | ..... | F16H 57/0447 184/6.12 |
| 2014/0172250 A1* | 6/2014 | Tamai | ..... | F16H 57/0447 701/51 |
| 2015/0057125 A1* | 2/2015 | Pump | ..... | F16H 48/08 475/160 |
| 2015/0285369 A1* | 10/2015 | Benson | ..... | F16H 57/0447 251/11 |
| 2016/0046151 A1* | 2/2016 | Kelly | ..... | B60B 35/16 74/607 |
| 2016/0069452 A1* | 3/2016 | Martin | ..... | F16H 57/045 137/571 |
| 2016/0186855 A1* | 6/2016 | Tahara | ..... | F16H 57/0471 74/413 |
| 2016/0369853 A1* | 12/2016 | Sugiura | ..... | F16H 57/0423 |

* cited by examiner

*Primary Examiner* — William E Dondero
*Assistant Examiner* — Robert T Reese

(57) ABSTRACT

A transmission storage oil level control system includes a first fluid reservoir and a second fluid reservoir separated from the first fluid reservoir by a barrier. A valve positioned in the barrier is controlled to open and close a fluid communication path between the second fluid reservoir and the first fluid reservoir. The valve is normally closed when a temperature of the hydraulic fluid is above a predetermined value. A sensor is positioned in at least one of the first reservoir and the second reservoir. The sensor identifies a condition of a hydraulic fluid. A control device communicates with the valve to apply a signal received from the sensor to selectively open and close the valve when the temperature of the hydraulic fluid is above the predetermined value.

15 Claims, 4 Drawing Sheets

TRANSMISSION STORAGE OIL LEVEL CONTROL WITH A SOLENOID ON AND OFF PULSE

FIELD

The present disclosure relates to an active electromechanical hydraulic fluid level control system for an automatic transmission, and more particularly to an assembly and system for actively controlling hydraulic fluid level between a sump and a side or front cover in an automatic transmission using an electromechanical device.

BACKGROUND

The statements in this section merely provide background information related to the present disclosure and may or may not constitute prior art.

A typical automatic transmission includes a hydraulic control system that is employed to provide cooling and lubrication to components within the transmission and to actuate a plurality of torque transmitting devices such as clutches and brakes. The hydraulic control system typically includes a sump located at a bottom of the transmission that collects hydraulic oil or hydraulic fluid passed through the hydraulic control system. The sump stores the hydraulic fluid to be suctioned back into the hydraulic control system by a pump. A minimum level of hydraulic fluid is required in the sump in order to feed the hydraulic control system for all ranges of transmission operation and to account for dynamic movement of the hydraulic fluid within the sump. It is desirable to keep the amount of hydraulic fluid stored in the sump at this minimum level because excessive hydraulic fluid in the sump can interfere with rotating components of the transmission. The rotating components include for example gears, clutch plates, and interconnecting members. The rotating components traveling through the sump hydraulic fluid can generate undesirable aeration of the hydraulic fluid and increased drag, thus increasing spin losses which in turn decrease the efficiency of the transmission.

The minimum level of hydraulic fluid that must be stored in the sump varies based on factors including hydraulic fluid operating temperature, pressure, and vehicle speed. It is desirable to store excess hydraulic fluid out of the sump and in a separate area that does not interfere with rotating components. One solution is to transfer hydraulic fluid using a passive thermally actuated valve between the sump and a storage area such as a front or side cover of the transmission. Known passive thermal valves and storage area chambers have overflow ports allowing hydraulic fluid to flow between the sump and the storage area based primarily on the temperature of the hydraulic fluid.

For most operating conditions, oil level in the storage area will remain at the level of an oil pipe connected to the sump. At some extreme operating conditions, however, such as high vehicle speeds which generate high oil temperature and high oil pressure, the storage area oil level can reach higher than the oil pipe. A pass is therefore provided which defines an opening at the top of the storage area connecting the storage area with the sump. If the extreme conditions continue for a sufficient time, the storage oil level can flow freely back to the sump through the pass, which can contact the rotating components.

While these systems are useful for their intended purpose, there is a need in the art for an active control system that minimizes cost and mass and that allows excess hydraulic fluid to be stored out of the sump during normal operating conditions but not during certain other conditions, such as end-of-line testing or transportation of the transmission.

SUMMARY

According to several aspects, a transmission storage oil level control system includes a first fluid reservoir and a second fluid reservoir. A valve is controlled to open and close a fluid communication path between the second fluid reservoir and the first fluid reservoir. A sensor is positioned in at least one of the first reservoir and the second reservoir. A control device communicates with the valve to apply a signal received from the sensor to selectively open and close the valve.

In an additional aspect of the present disclosure, a fluid passage is created between the second fluid reservoir and the first fluid reservoir positioned above an elevation of the valve.

In another aspect of the present disclosure, the sensor is positioned in the second fluid reservoir below an elevation of the fluid passage, the sensor issuing the signal to identify when a predefined condition of a hydraulic fluid in the second fluid reservoir is present.

In another aspect of the present disclosure, the predefined condition of the hydraulic fluid is a fluid temperature used in combination with a predefined range of hydraulic line pressures to define a pulse zone for operation of the solenoid.

In another aspect of the present disclosure, the predefined condition of the hydraulic fluid is a fluid temperature used in combination with a predefined range of vehicle speeds to define a pulse zone for operation of the solenoid.

In another aspect of the present disclosure, the predefined condition of the hydraulic fluid is a sensed presence of the hydraulic fluid at the level of the sensor.

In another aspect of the present disclosure, the valve is positioned below an elevation of a hydraulic fluid minimum level of the first reservoir.

In another aspect of the present disclosure, the sensor is positioned in the first fluid reservoir below the elevation of the hydraulic fluid minimum level of the first reservoir, the sensor issuing the signal to identify when a predefined condition of a hydraulic fluid in the first fluid reservoir is present.

In another aspect of the present disclosure, the predefined condition of the hydraulic fluid is a fluid temperature used in combination with a predefined range of hydraulic line pressures to define a pulse zone for operation of the solenoid.

In another aspect of the present disclosure, the predefined condition of the hydraulic fluid is a fluid temperature used in combination with a predefined range of vehicle speeds to define a pulse zone for operation of the solenoid.

In another aspect of the present disclosure, a fluid transfer member is positioned in the second reservoir acting to direct a flow of a hydraulic fluid in the second reservoir through a flow port back to the first reservoir, the flow port created in a barrier separating the second barrier from the first barrier.

In another aspect of the present disclosure, the fluid transfer member includes a baffle separating the fluid transfer member into first and second compartments, the baffle having a baffle free end defining a normal maximum level of the hydraulic fluid within the second reservoir, the normal maximum level located above an elevation of the valve.

In another aspect of the present disclosure, the first reservoir defines a sump of the transmission and the second reservoir defines a storage area of the transmission, the storage area further including a hydraulic controls body.

In another aspect of the present disclosure, the control device is one of a variable force solenoid and an on-off solenoid.

According to further aspects of the present disclosure, a transmission storage oil level control system includes a first fluid reservoir and a second fluid reservoir separated from the first fluid reservoir by a barrier. The second fluid reservoir receives hydraulic fluid from the first fluid reservoir. A valve positioned in the barrier is controlled to open and close a fluid communication path between the second fluid reservoir and the first fluid reservoir. The valve is normally open when a temperature of the hydraulic fluid is below a predetermined value Tp° C. to allow flow of hydraulic fluid from the second fluid reservoir to the first fluid reservoir through the valve, and the valve is normally closed when a temperature of the hydraulic fluid is above a predetermined value Tp° C. to prevent flow of hydraulic fluid from the second fluid reservoir to the first fluid reservoir through the valve. A fluid transfer member is positioned in the second reservoir acting to direct a flow of the hydraulic fluid in the second reservoir through a flow port back to the first reservoir after the hydraulic fluid in the second reservoir reaches a normal maximum level above an elevation of the valve. A sensor is positioned in at least one of the first reservoir and the second reservoir. The sensor identifies a predefined condition of the hydraulic fluid. A control device communicates with the valve to apply a signal from the sensor to selectively open and close the valve when the predefined condition of the hydraulic fluid is present, allowing the valve to be selectively opened and closed when the temperature of the hydraulic fluid is above the predetermined value Tp° C.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
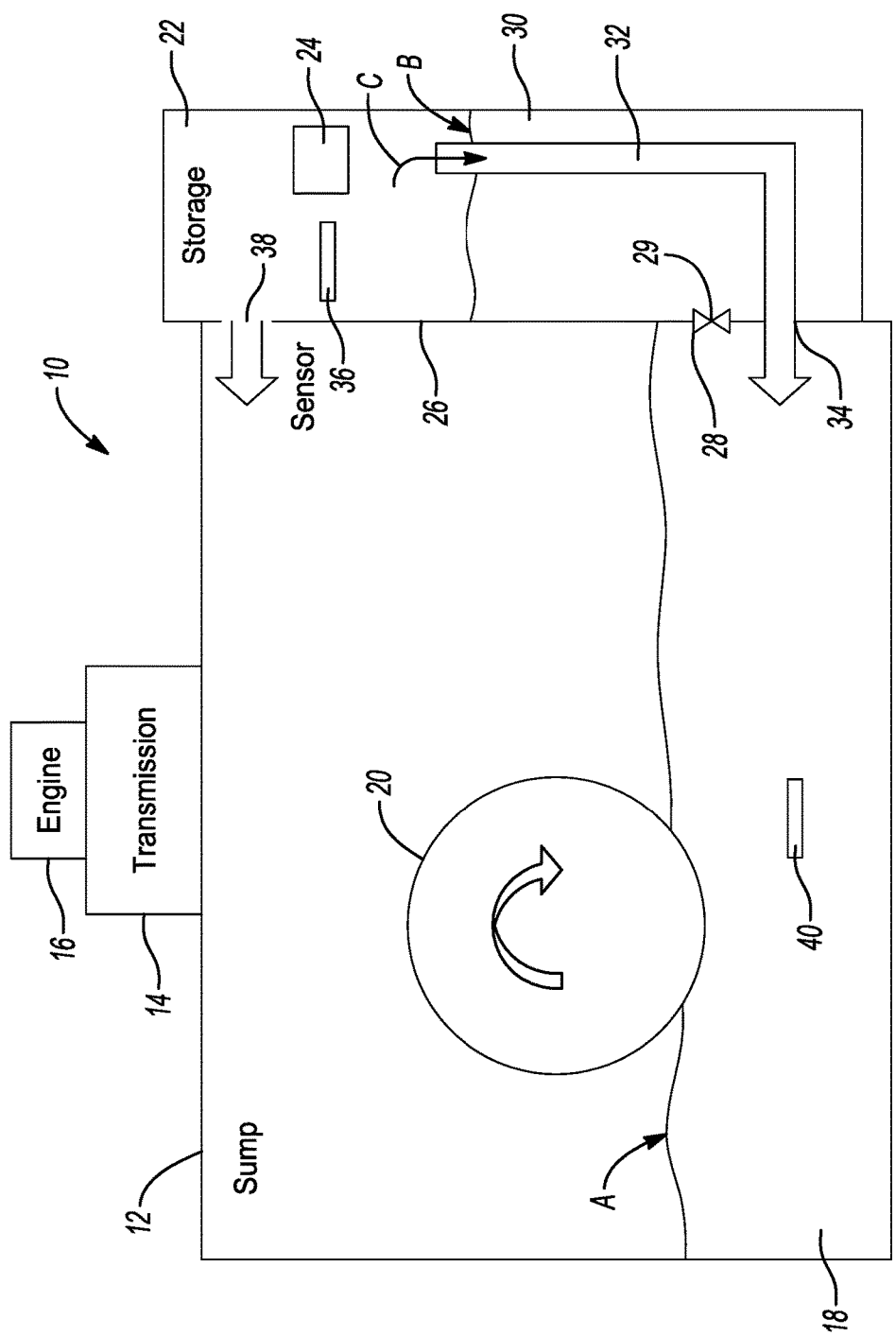
FIG. 1 is a diagram of a transmission having an oil level storage control system of the present disclosure.

Referring to FIG. 1, a transmission oil level storage control system 10 includes a hydraulic fluid sump 12 defining a first fluid reservoir provided in a transmission 14. An engine 16 is connected to the transmission 14 to provide motive power to the transmission 14. A hydraulic fluid 18 such as hydraulic oil is collected generally at a bottom area of the sump 12 and is maintained at a hydraulic fluid minimum level "A" sufficient to provide lubrication to one or more rotating components generally indicated at 20. The rotating components 20 can include one or more of gears, clutch plates, and interconnecting members, together with bearings and bushes. The hydraulic fluid minimum level "A" is also selected to minimize direct immersion in the hydraulic fluid, and to limit impingement of the rotating components by the hydraulic fluid to minimize hydraulic fluid aeration and hydraulic spin losses of the rotating components.

The transmission 14 further includes a storage area 22 defining a second fluid reservoir positioned proximate to the sump 12, which includes a hydraulic controls body 24 having hydraulic control valves and associated equipment. A barrier 26 such as a sump wall defines a fluid boundary between the sump 12 and the storage area 22. An electronically controlled oil level control valve 28 is connected to and defines a passage through the barrier 26 and is positioned below the minimum level "A" such that the oil level control valve 28 when open allows transfer of the hydraulic fluid 18 back and forth between the sump 12 and the storage area 22. The storage area 22 stores a volume of hydraulic fluid 30 which is returned to the sump 12 as necessary.

A fluid transfer member 32 is positioned in the storage area 22 which directs a flow of the hydraulic fluid 30 from the storage area 22 through a flow port 34 created in the barrier 26 located at an elevation below an elevation of the valve 28 back to the sump 12. The hydraulic fluid 30 within the storage area 22 is normally maintained at or below a normal maximum level "B" by the fluid transfer member 32, which will be described in greater detail in reference to FIG. 2. Hydraulic fluid enters the fluid transfer member 32 in the direction of flow arrow "C". The hydraulic fluid 18 flows into the storage area 22 during normal operation of the transmission 14. A sensor 36 can also be provided within the storage area 22, which can operate as a thermal sensor, a liquid detection sensor, or the like. An output of the sensor 36 can be used to trigger opening or closing of the oil level control valve 28. The storage area 22 can be filled or emptied depending on the temperature of the hydraulic fluid 18 or the hydraulic fluid 30. Normally, when the hydraulic fluid temperature is low the storage area 22 is emptied to send hydraulic fluid to the sump 12 to ensure the sump 12 has sufficient volume to provide for hydraulic system operation. When the hydraulic fluid temperature reaches a predefined high temperature, hydraulic fluid is transferred to the storage area 22 to improve fuel economy of the engine 16.

An overflow or fluid passage 38 is provided in and extends through an upper portion of the barrier 26. The fluid passage 38 allows hydraulic fluid 30 which due to certain operating conditions of the transmission 14 substantially fills the storage area 22 to flow back into the sump 12. The flow of hydraulic fluid through the fluid passage 38 is undesirable, however, because it may be at high temperature and because it may directly contact the rotating components 20, which can cause aeration of the hydraulic fluid, thereby reducing the working life and lubricating properties of the hydraulic fluid. According to further aspects, a sensor 40 can also be provided within the normal level of the hydraulic fluid 18 within the sump 12 below the height defined by the normal minimum level "A". The sensor 40 can provide a signal such as a high temperature condition of the hydraulic fluid 18, which together with the output from the sensor 36 can be used to control operation of the oil level control valve 28.

Referring to FIG. 2 and again to FIG. 1, the rotating components 20 of the transmission 14 receive a driving force from axial rotation of a transmission input shaft 42. The transmission input shaft 42 is normally positioned above the normal minimum level "A" of the hydraulic fluid 18 within the sump 12. According to several aspects, the fluid transfer member 32 of the transmission oil level storage control system 10 is provided as a molded polymeric component having separate internal compartments. During normal operation of the transmission 14 hydraulic fluid 18 from the sump 12 displaces through multiple hydraulic channels 44 created in the barrier 26 into the storage area 22, or through the oil level control valve 28. The hydraulic fluid 30 enters the fluid transfer member 32 at a low entrance portion 46. The fluid transfer member 32 includes a baffle 48 which separates a first compartment 50 from a second compartment 52. After the hydraulic fluid 30 enters the low entrance portion 46 it moves upwardly in a flow direction "D" through the first compartment 50. A window 54 is provided through a wall of the fluid transfer member 32 in the first compartment 50 corresponding in height to the oil level control valve 28.

From a hydraulic fluid temperature of approximately −40° C. up to a predefined hydraulic fluid temperature Tp° C. the oil level control valve 28 is open, to return substantially all of the hydraulic fluid 30 back to the sump 12. If the oil level control valve 28 is open hydraulic fluid 30 from the first compartment 50 can be directed through the window 54, through the oil level control valve 28, and back into the sump 12. The storage area 22 is therefore substantially empty at this time. At or above the predefined hydraulic fluid temperature Tp° C. the oil level control valve 28 is normally closed and the oil level in the storage area 22 will increase. Once the hydraulic fluid 30 reaches the normal maximum level "B" hydraulic fluid will flow back to the sump 12, thereby keeping the fluid level in the storage area 22 substantially constant at the normal maximum level "B".

If the oil level control valve 28 is closed and also when hydraulic fluid flow into the fluid transfer member 32 is high, the hydraulic fluid 30 continues past the window 54 up to a baffle free end 56. Upon reaching the baffle free end 56, the hydraulic fluid 30 overflows from the first compartment 50 into the second compartment 52. The baffle free end 56 therefore defines the normal maximum level "B" of hydraulic fluid 30 in the storage area 22. In the second compartment 52 the hydraulic fluid 30 travels downward aided by gravity in a downward direction "E" until reaching a lower end 58 of the second compartment 52. The lower end 58 is in fluid communication with the flow port 34 created in the barrier 26 which returns the hydraulic fluid to the sump 12.

As previously noted, under extreme operating conditions of the transmission 14, or if the oil level control valve 28 does not open, the hydraulic fluid 30 in the storage area 22 can flow upwardly out of the fluid transfer member 32 until reaching the fluid passage 38. Direct overflow of the hydraulic fluid 30 can occur via the fluid passage 38 back into the sump 12. Operating control for the oil level control valve 28 is provided by a control device 60 which according to several aspects is an on-off solenoid. The control device 60 can also be selected from several different solenoid designs, including but not limited to a variable force solenoid (VFS). Operation of the control device 60 and thereby the oil level control valve 28 will be discussed in reference to FIGS. 3 through 7. The control device 60 is in communication with the oil level control valve 28 for example mechanically or electrically.

Figure 2:
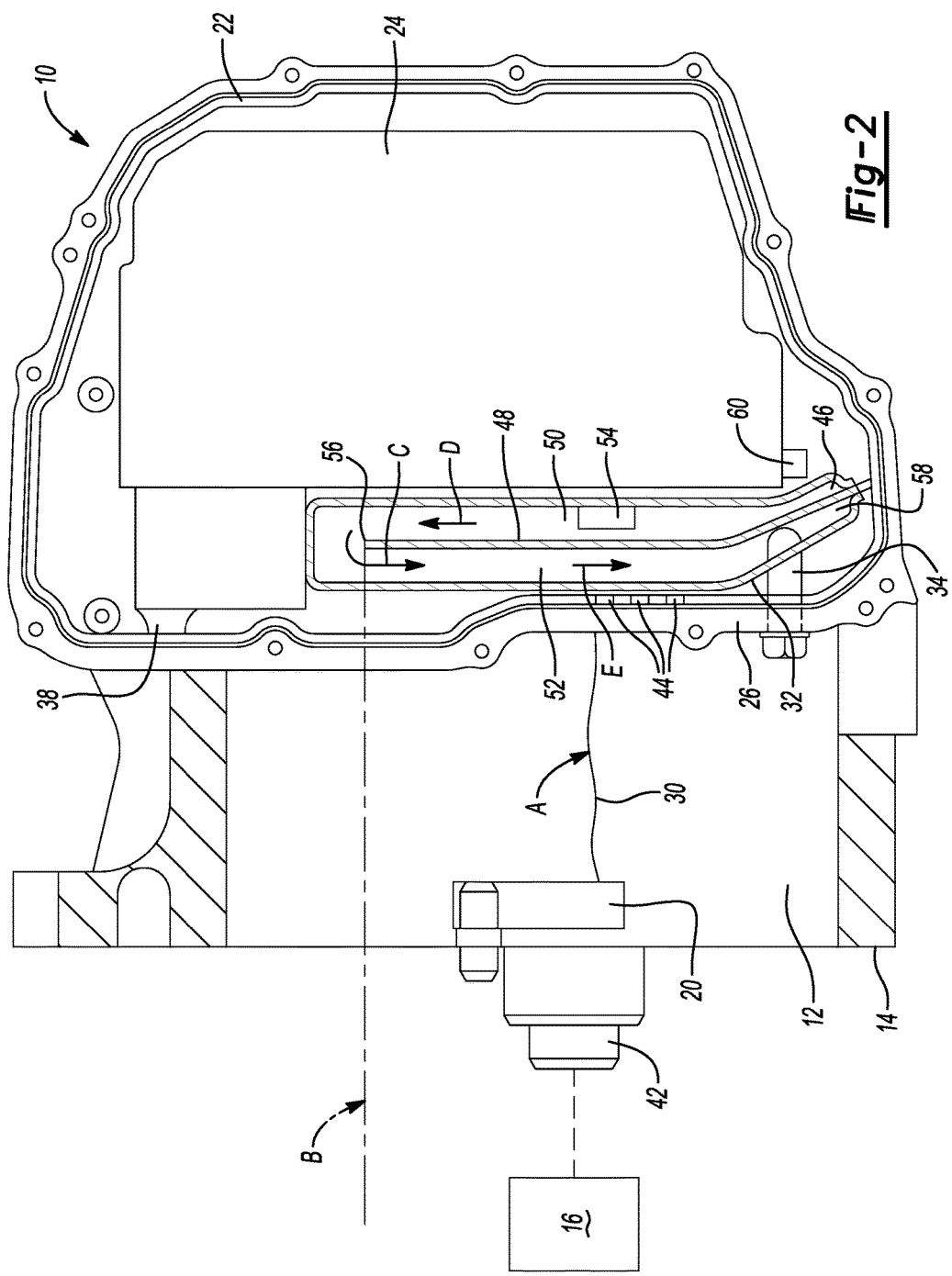
FIG. 2 is a cross sectional front elevational view of the transmission of FIG. 1.

Referring to FIG. 3 and again to FIGS. 1 through 2, in known systems having a thermally actuated valve in place of the oil level control valve 28 the thermally actuated valve has only two discrete operating conditions, either open or closed. It is normal in these systems to close the thermally actuated valve at all hydraulic fluid temperatures above a predetermined value. This leaves an overflow passage such as the fluid passage 38 as the only outlet path for high temperature hydraulic fluid. Through the use of the transmission oil level storage control system 10, discrete control is provided for operation of the oil level control valve 28 when predetermined system conditions are met. For example, when the hydraulic fluid 30 in the storage area 22 is at or above the predefined hydraulic fluid temperature Tp° C. and certain operating conditions such as high pressure or a temperature higher than a predetermined value above hydraulic fluid temperature Tp° C. are met, the oil level control valve 28 can be directed open. Discrete control of oil level control valve 28 can be provided for example using different pulsing frequencies to transfer a portion of the volume of hydraulic fluid 30 from the storage area 22 back to the sump 12, to thereby preclude the hydraulic fluid 30 from reaching the fluid passage 38.

Figure 3:
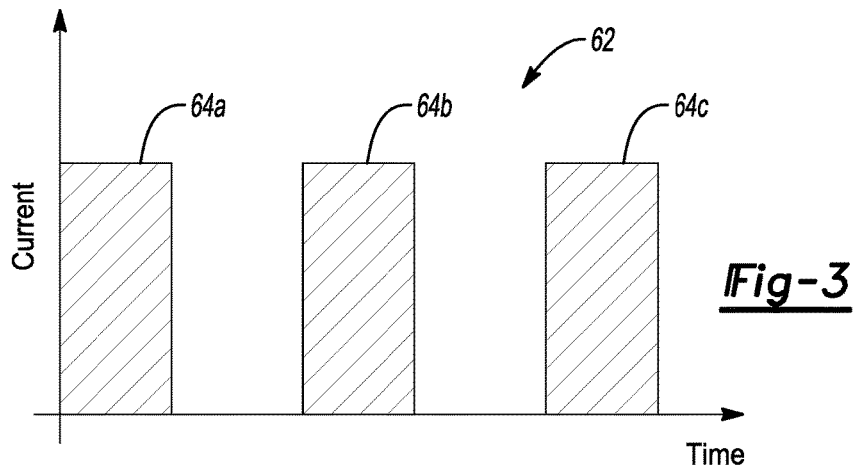
FIG. 3 is a graph of current versus time representing a pulsed signal for solenoid and oil level control valve operation.
Figure 4:
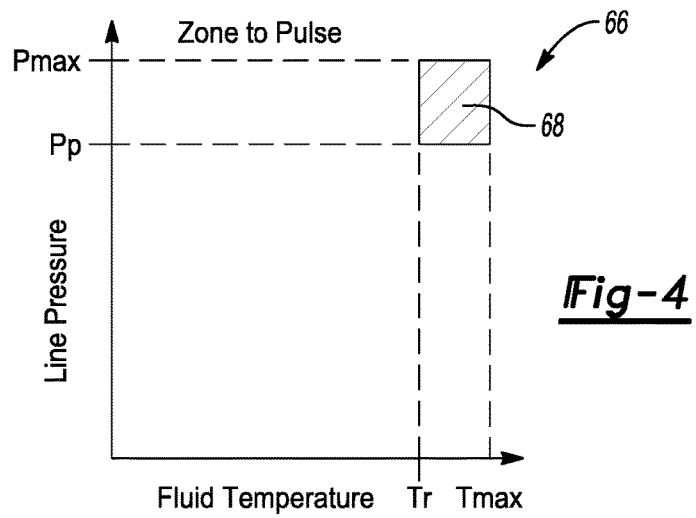
FIG. 4 is a graph of hydraulic line pressure versus hydraulic fluid temperature identifying a pulse zone for operation of a solenoid of the present disclosure.

The predetermined conditions for actuating the oil level control valve 28 can be by either an open loop control or a closed loop control. An exemplary closed loop control during a high temperature hydraulic fluid condition can be through use of the sensor 36 (shown in FIG. 1) which is positioned below the level of the fluid passage 38. When the hydraulic fluid level reaches the position of the sensor 36, the control device 60 is energized to start pulsing at a predetermined frequency Hz1 and for a duration of time T1. As shown in FIG. 3 and with continuing reference to FIGS. 1 and 2, a current for actuating the control device 60 can be pulsed over time such as using pulses 64a, 64b, 64c to open and close the oil level control valve 28 until the signal output from the sensor 36 indicates the hydraulic fluid level or temperature has decreased and therefore that the hydraulic fluid 30 will not reach the fluid passage 38.

Closed loop control during a lower temperature hydraulic fluid condition (e.g., above the predefined hydraulic fluid temperature Tp° C. but lower than a high temperature condition expected at high speed vehicle operation) can be through use of the sensor 40 (shown in FIG. 1) which is positioned below the normal minimum level "A" of the hydraulic fluid 18 within the sump 12. When the level of the hydraulic fluid 18 drops down to the position of the sensor 40, the control device 60 is energized using a signal from the sensor 40 to start pulsing at a predetermined frequency Hz2 and for a duration of time T2, which can be the same or different than frequency Hz1 and duration of time T1. The sensor 40 and the oil level control valve 28 can therefore be used to return a portion of the volume of hydraulic fluid 30 in the storage area 22 back to the sump 12, for example when the temperature of the hydraulic fluid 30 may not be below the predefined hydraulic fluid temperature Tp° C. when the oil level control valve 28 is normally closed.

Referring to FIGS. 4 and 5, and again to FIGS. 1 through 3, exemplary open loop control during high temperature hydraulic fluid conditions are provided. As more specifically shown in FIG. 4, a graph 66 identifies if the hydraulic fluid temperature is above a predefined temperature Tr, and if a hydraulic fluid line pressure is above a predefined pressure Pp, the control device 60 is used to pulse open and closed the oil level control valve 28. Pulsing the oil level control valve 28 open and closed will return a portion of the hydraulic fluid 30 back to the sump 12. A pulse zone 68 can be predefined when the above conditions of temperature and pressure are met.

Figure 5:
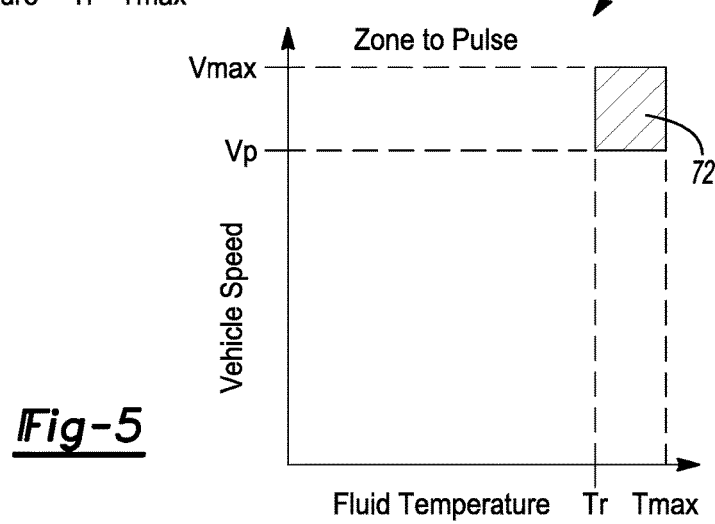
FIG. 5 is a graph of vehicle speed versus hydraulic fluid temperature identifying a pulse zone for operation of a solenoid of the present disclosure.
Figure 6:
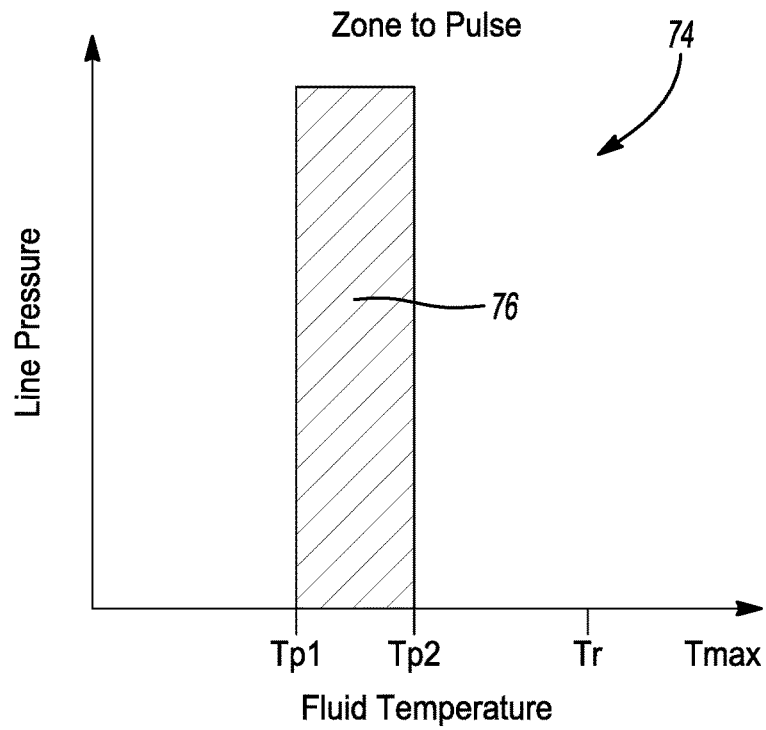
FIG. 6 is a graph of hydraulic line pressure versus hydraulic fluid temperature identifying a pulse zone for operation of a solenoid of the present disclosure.

As more specifically shown in FIG. 5, a graph 70 identifies if the hydraulic fluid temperature is above the predefined temperature Tr, and if the vehicle speed is above a predefined vehicle speed Vp, the control device 60 is used to pulse open and closed the oil level control valve 28. Pulsing the oil level control valve 28 open and closed will return a portion of the hydraulic fluid 30 back to the sump 12. A pulse zone 72 can be predefined when the above conditions of temperature and vehicle speed are met.

Referring to FIGS. 6 and 7, and again to FIGS. 1 through 3, exemplary open loop control during lower temperature hydraulic fluid conditions are provided. As more specifically shown in FIG. 6, a graph 74 identifies if the hydraulic fluid temperature reaches a predefined temperature Tp1, the control device 60 can be used to pulse open and closed the oil level control valve 28 over a predefined range of hydraulic system line pressures. The control device 60 can be used to pulse open and closed the oil level control valve 28 until the hydraulic fluid temperature reaches a second predefined temperature Tp2 over the predefined range of hydraulic system line pressures. Pulsing the oil level control valve 28 open and closed will return a portion of the hydraulic fluid 30 back to the sump 12. A pulse zone 76 can be predefined when the above conditions of temperature and hydraulic line pressures are met. The oil level control valve 28 can thereafter remain closed until the hydraulic fluid reaches the high temperature condition Tr described in reference to FIGS. 5 and 6.

Figure 7:
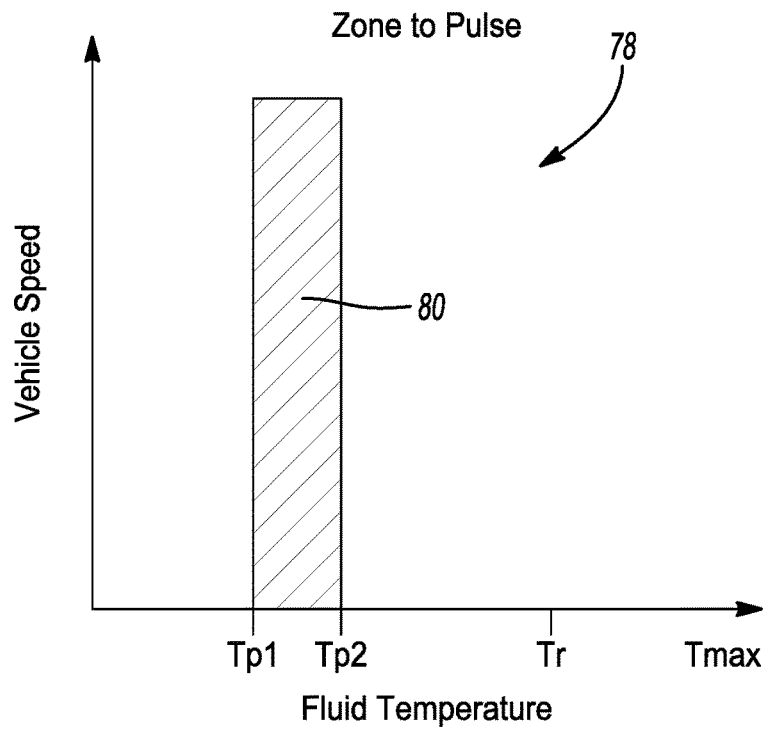
FIG. 7 is a graph of vehicle speed versus hydraulic fluid temperature identifying a pulse zone for operation of a solenoid of the present disclosure.

As more specifically shown in FIG. 7, a graph 78 identifies if the hydraulic fluid temperature reaches the predefined temperature Tp1, the control device 60 can be used to pulse open and closed the oil level control valve 28 over a predefined range of vehicle speeds. The control device 60 can be used to pulse open and closed the oil level control valve 28 until the hydraulic fluid temperature reaches a second predefined temperature Tp2 over the predefined range of vehicle speeds. Pulsing the oil level control valve 28 open and closed will return a portion of the hydraulic fluid 30 back to the sump 12. A pulse zone 80 can be predefined when the above conditions of temperature and vehicle speed are met. The oil level control valve 28 can thereafter remain closed until the hydraulic fluid reaches the high temperature condition Tr described in reference to FIGS. 5 and 6.

According to several aspects of the present disclosure, a transmission storage oil level control system 10 includes a first fluid reservoir 12 and a second fluid reservoir 22 separated from the first fluid reservoir 12 by a barrier 26. A valve 28 is positioned in the barrier 26 controlled to open and close a fluid communication path 29 between the second fluid reservoir 22 and the first fluid reservoir 12. The valve 28 is normally closed when a temperature of the hydraulic fluid 18, 30 is above a predetermined value Tp° C. A sensor 36, 40 is positioned in at least one of the first reservoir 12 and the second reservoir 22, the sensor 36, 40 identifying a condition of a hydraulic fluid 18, 30. A control device 60 communicates with the valve 28 to apply a signal received from the sensor 36, 40 to selectively open and close the valve 28.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission storage oil level control system, comprising:
    a first fluid reservoir;
    a second fluid reservoir;
    a valve controlled to open and close a fluid communication path between the second fluid reservoir and the first fluid reservoir;
    a sensor positioned in at least one of the first reservoir and the second reservoir;
    a control device communicating with the valve to apply a signal received from the sensor to selectively open and close the valve; and
    a fluid passage created between the second fluid reservoir and the first fluid reservoir positioned above an elevation of the valve;
    wherein the sensor is positioned in the second fluid reservoir below an elevation of the fluid passage, the sensor issuing the signal to identify when a predefined condition of a hydraulic fluid in the second fluid reservoir is present.

2. The transmission storage oil level control system of claim 1, wherein the predefined condition of the hydraulic fluid is a fluid temperature used in combination with a predefined range of hydraulic line pressures to define a pulse zone for operation of the solenoid.

3. The transmission storage oil level control system of claim 1, wherein the predefined condition of the hydraulic fluid is a fluid temperature used in combination with a predefined range of vehicle speeds to define a pulse zone for operation of the solenoid.

4. The transmission storage oil level control system of claim 1, wherein the predefined condition of the hydraulic fluid is a sensed presence of the hydraulic fluid at the level of the sensor.

5. The transmission storage oil level control system of claim 1, wherein the valve is positioned below an elevation of a hydraulic fluid minimum level of the first reservoir.

6. The transmission storage oil level control system of claim 5, wherein the sensor is positioned in the first fluid reservoir below the elevation of the hydraulic fluid minimum level of the first reservoir, the sensor issuing the signal to identify when a predefined condition of a hydraulic fluid in the first fluid reservoir is present.

7. The transmission storage oil level control system of claim 6, wherein the predefined condition of the hydraulic fluid is a fluid temperature used in combination with a predefined range of hydraulic line pressures to define a pulse zone for operation of the solenoid.

8. The transmission storage oil level control system of claim 6, wherein the predefined condition of the hydraulic fluid is a fluid temperature used in combination with a predefined range of vehicle speeds to define a pulse zone for operation of the solenoid.

9. The transmission storage oil level control system of claim 1, further including a fluid transfer member positioned in the second reservoir acting to direct a flow of a hydraulic fluid in the second reservoir through a flow port back to the first reservoir, the flow port created in a barrier separating the second barrier from the first barrier.

10. The transmission storage oil level control system of claim 9, wherein the fluid transfer member includes a baffle separating the fluid transfer member into first and second compartments, the baffle having a baffle free end defining a normal maximum level of the hydraulic fluid within the second reservoir, the normal maximum level located above an elevation of the valve.

11. The transmission storage oil level control system of claim 1, wherein the first reservoir defines a sump of the transmission and the second reservoir defines a storage area of the transmission, the storage area further including a hydraulic controls body.

12. The transmission storage oil level control system of claim 1, wherein the control device is one of a variable force solenoid and an on-off solenoid.

13. A transmission storage oil level control system, comprising:
    a first fluid reservoir;
    a second fluid reservoir separated from the first fluid reservoir by a barrier;
    a valve positioned in the barrier controlled to open and close a fluid communication path between the second fluid reservoir and the first fluid reservoir, the valve normally closed when a temperature of the hydraulic fluid is above a predetermined value Tp° C.;
    a sensor positioned in at least one of the first reservoir and the second reservoir, the sensor identifying a condition of a hydraulic fluid; and
    a control device communicating with the valve to apply a signal received from the sensor to selectively open and close the valve;
    wherein the sensor is positioned in the second reservoir and the predefined condition of the hydraulic fluid is a fluid temperature above the predetermined value Tp° C. of the hydraulic fluid in the second fluid reservoir, the predefined condition used in combination with a predefined range of hydraulic line pressures to define a pulse zone for pulsed operation of the solenoid.

14. The transmission storage oil level control system of claim 13, wherein the predefined condition is used in combination with a predefined range of vehicle speeds to define a pulse zone for pulsed operation of the solenoid.

15. A transmission storage oil level control system, comprising:
    a first fluid reservoir;
    a second fluid reservoir separated from the first fluid reservoir by a barrier, the second fluid reservoir receiving hydraulic fluid from the first fluid reservoir;
    a valve positioned in the barrier controlled to open and close a fluid communication path between the second fluid reservoir and the first fluid reservoir, the valve normally open when a temperature of the hydraulic fluid is below a predetermined value Tp° C. to allow flow of hydraulic fluid from the second fluid reservoir to the first fluid reservoir through the valve, and the valve normally closed when a temperature of the hydraulic fluid is above a predetermined value Tp° C. to prevent flow of hydraulic fluid from the second fluid reservoir to the first fluid reservoir through the valve;
    a fluid transfer member positioned in the second reservoir acting to direct a flow of the hydraulic fluid in the second reservoir through a flow port back to the first reservoir after the hydraulic fluid in the second reservoir reaches a normal maximum level above an elevation of the valve;
    a sensor positioned in at least one of the first reservoir and the second reservoir, the sensor identifying a predefined condition of the hydraulic fluid; and
    a control device communicating with the valve to apply a signal from the sensor to selectively open and close the valve when the predefined condition of the hydraulic fluid is present, allowing the valve to be selectively opened and closed when the temperature of the hydraulic fluid is above the predetermined value Tp° C.

\* \* \* \* \*